United States Patent
Cho

(10) Patent No.: US 6,859,298 B2
(45) Date of Patent: Feb. 22, 2005

(54) OPTICAL MODULE OF OPTICAL ISOLATOR STRUCTURE

(75) Inventor: Shi-Yun Cho, Seoul (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 0 days.

(21) Appl. No.: 10/713,488

(22) Filed: Nov. 14, 2003

(65) Prior Publication Data

US 2005/0007646 A1 Jan. 13, 2005

(30) Foreign Application Priority Data

Jul. 9, 2003 (KR) ................................ 10-2003-0046538

(51) Int. Cl.⁷ .............................. G02F 1/09; G02B 6/26
(52) U.S. Cl. ...................... 359/281; 359/280; 359/283; 385/31
(58) Field of Search ................................ 359/281, 280, 359/240, 238, 237, 283; 385/31, 33

(56) References Cited

U.S. PATENT DOCUMENTS 5,066,092 A * 11/1991 Droegemueller et al. ..... 385/33
5,076,675 A * 12/1991 Kusaka et al. .............. 359/484

* cited by examiner

*Primary Examiner*—Timothy Thompson
(74) *Attorney, Agent, or Firm*—Cha & Reiter, L.L.C.

(57) ABSTRACT

Disclosed is an optical module of an isolator structure including a semiconductor laser, a polarizer, and a Faraday rotator. The laser outputs a first linearly-polarized beam of a predetermined polarization mode. The polarizer is positioned to face an end of the laser, and its polarization axis is tilted at a 45° angle with respect to the polarization direction of the first beam. The Faraday rotator is disposed between the laser and the polarizer, and rotate the polarization direction of the first beam by 45° to substantially coincide with the polarization axis of the polarizer, and then output it to the polarizer, and to rotate a second beam from the polarizer by 45°, wherein the second beam has a polarization mode polarized perpendicular to the first beam, and then output it to the semiconductor laser.

9 Claims, 2 Drawing Sheets

OPTICAL MODULE OF OPTICAL ISOLATOR STRUCTURE

CLAIM OF PRIORITY

This application claims priority to an application entitled "OPTICAL MODULE OF OPTICAL ISOLATOR STRUCTURE," filed in the Korean Intellectual Property Office on Jul. 9, 2003 and assigned Serial No. 2003-46538, the contents of which are hereby incorporated by reference.

BACKGROUND OF THE INVENTION

1. Field of the Invention

The present invention relates to an optical module for use in an optical communication system, and more particularly to an optical module including an optical isolator.

2. Description of the Related Art

An optical communication system generally includes optical transmitter and receiver modules for transmitting and receiving optical signals. In addition, the system includes an optical fiber, serving as an optical-signal transmission medium, for providing a connection between the optical transmitter and receiver modules, and various other optical parts such as an optical connector and/or an optical splitter. These optical parts are connected to each other to implement various functions of the optical communication system.

Backward reflection light causes disturbances and malfunctions in the system, particularly in the semiconductor lasers. Light that is partially reflected or scattered and travels backward, opposite to its original direction of travel, is caused by a number of situations—for example, if the different optical parts are not coupled properly or the medium for carrying optical signals is non-uniform.

A number of solutions have been proposed to prevent the disturbance and malfunction due to the backward reflection light of a light source such as the semiconductor laser. A widely used manner is an optical communication system, which employs an optical part such as an isolator, for confining the traveling direction of light to only one direction.

FIG. 1 shows an optical module including a conventional isolator and a semiconductor laser. As shown in this drawing, the optical module includes a semiconductor laser 110 for outputting light of a predetermined wavelength, and an isolator 120 for transmitting the light outputted from the laser 110 and blocking a backward reflection beam from being inputted to the laser 110.

The isolator 120 includes a polarizer 121, a Faraday rotator 122, and an analyzer 123. The polarizer 121 transmits light only of a predetermined linearly-polarized component. The rotator 122 rotates the linear polarization direction of light by 45°. The analyzer 123 transmits light only of a predetermined linearly-polarized component. It is assumed that the traveling direction of light outputted from the laser 110 corresponds to the Z-axis. The two orthogonal axes perpendicular to the Z-axis are the X and Y-axes.

The polarization axis of the polarizer 121 is parallel to the Y-axis. The polarizer 121 is disposed to face an end of the semiconductor laser 110. It transmits only a light beam coinciding with its polarization axis, among light beams outputted from the laser 110, to the Faraday rotator 122.

The Faraday rotator 122 is disposed so that its one end faces the polarizer 121. It rotates the linear polarization direction of light, which enters it through the polarizer 121, by 45° with respect to the polarization axis of the polarizer 121. Thereafter the light is output to the analyzer 123.

The analyzer 123 is disposed symmetrically to the polarizer 121 with the rotator 122 being positioned between the analyzer 123 and the polarizer 122. The analyzer's 123 polarization axis is inclined at 45° with respect to that of the polarizer 123. In other words, the polarization axis of the analyzer 123 is tilted at 45° to each of the X and Y-axes. The polarization axis of the analyzer 123 thus coincides with that of light outputted from the Faraday rotator 122. The light is linearly polarized and rotated by 45° so that the analyzer 123 transmits the light outputted from the rotator 122.

The isolator 120 blocks reflection light. In particular, the analyzer 123 transmits only a reflection beam linearly polarized at 45°, from the external reflection beams incident on the analyzer 123, to the Faraday rotator 122. The rotator 122 rotates the linear polarization direction of the reflection light, from the analyzer 123, by 45°. The light is thus perpendicular to the polarization axis of the polarizer 121. Then it is output to the polarizer 121. The polarizer 121 blocks the reflection light and is prevented from entering the semiconductor laser 110.

However, a conventional isolator requires an accurate optical-axis alignment so that the polarization axes of the polarizer and analyzer are correctly positioned at 45° to each other. The conventional isolator has a number of limitations including increased fabrication delay time due to such an optical-axis alignment. Further, the use of a large number of optical parts increases production costs.

SUMMARY OF THE INVENTION

Therefore, the present invention has been made to reduce or overcome the above problems in the art. One object of the present invention is to provide an optical module having an isolator structure that can simplify optical-axis alignment and also reduce production costs.

In accordance with the principles of the present invention, an optical module of an optical isolator is provided comprising a semiconductor laser for outputting a first linearly-polarized beam of a predetermined polarization mode; a polarizer positioned to face an end of the semiconductor laser, wherein a polarization axis of the polarizer is tilted at a 45° angle with a polarization direction of the first beam; and a Faraday rotator between the semiconductor laser and the polarizer, wherein said rotator rotates the polarization direction of the first beam by 45° to substantially coincide with the polarization axis of the polarizer, and rotates a second beam from the polarizer by 45°, wherein the second beam has a polarization mode polarized perpendicular to the first beam.

BRIEF DESCRIPTION OF THE DRAWINGS

The present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings. For the purposes of clarity and simplicity, a detailed description of known functions and configurations incorporated herein will be omitted as it may make the subject matter of the present invention unclear.

Figure 1:
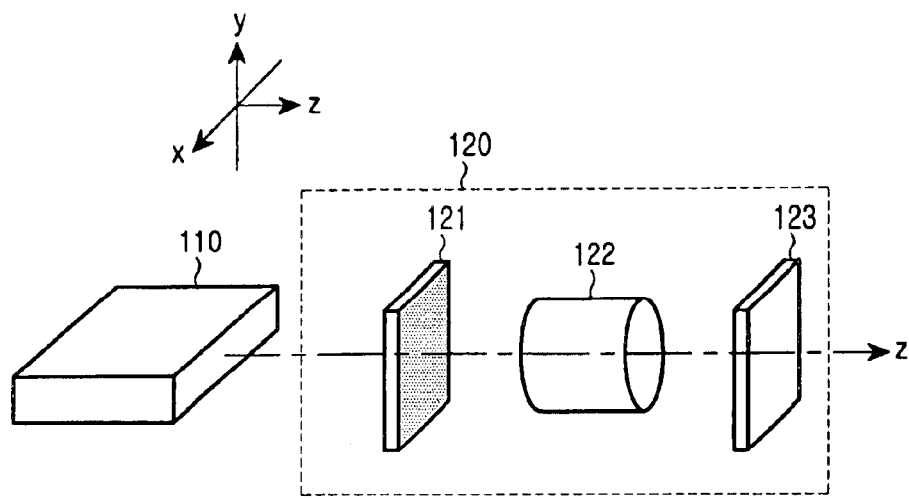
FIG. 1 shows an optical module including a conventional isolator and a semiconductor laser.
Figure 2:
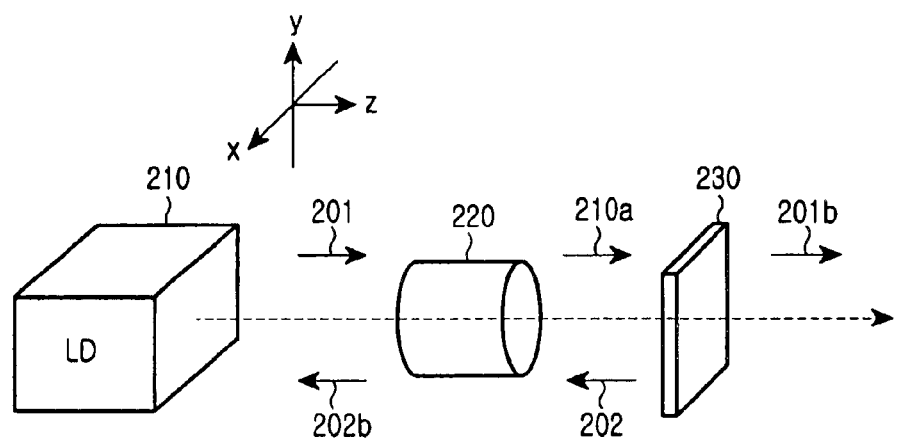
FIG. 2 shows an optical module of an optical isolator structure according to a preferred embodiment of the present invention.

FIG. 2 shows an optical module of an optical isolator structure according to a preferred embodiment of the present invention. As shown in this drawing, the optical module includes a semiconductor laser 210, a Faraday rotator 220, and a polarizer 230.

The semiconductor laser 210 outputs a first linearly-polarized beam 201 of TE polarization mode. This first beam 201 is free from the influence of light of TM polarization mode polarized perpendicular to the TE polarization mode. It is assumed that the traveling direction of light outputted from the semiconductor laser 210 corresponds to the Z-axis, and two orthogonal axes perpendicular to the Z-axis are the X and Y-axes. The first beam 201 of TE polarization mode is linearly polarized parallel to the Y-axis. The light of TM polarization mode is linearly polarized perpendicular to the first beam 201 and parallel to the X-axis.

The polarizer 230 faces an end of the semiconductor laser 210. It has a polarization axis tilted at 45° to X and Y-axes, i.e., at 45° with respect to the polarization direction of the first beam 201.

The Faraday rotator 220 is disposed between the semiconductor laser 210 and the polarizer 230. It rotates the first beam 201 outputted from the laser 210 by 45° to become a first rotated beam 201a. The first rotated beam 201a is linearly polarized in the direction coinciding with the polarization axis of the polarizer 230. The Faraday rotator 220 then outputs the first rotated beam 201a to the polarizer 230.

The rotator 220 rotates a second beam 202 inputted from the polarizer 230 by 45° to become a second rotated beam 202b. The second rotated beam 202b has a TM polarization mode which is linearly polarized perpendicular to the first beam 201. The rotator 220 then outputs the second rotated beam 202b to the laser 210. Since the second rotated linearly-polarized beam 202a has a TM polarization mode polarized perpendicular to the first beam 201, it exerts no influence on the first beam 201 of TE polarization mode, outputted from the laser 210.

The optical module may include an optical element (not shown) such as a lens disposed between the semiconductor laser 210 and the Faraday rotator 220, or disposed to face an outer surface of the polarizer 230.

Figure 3:
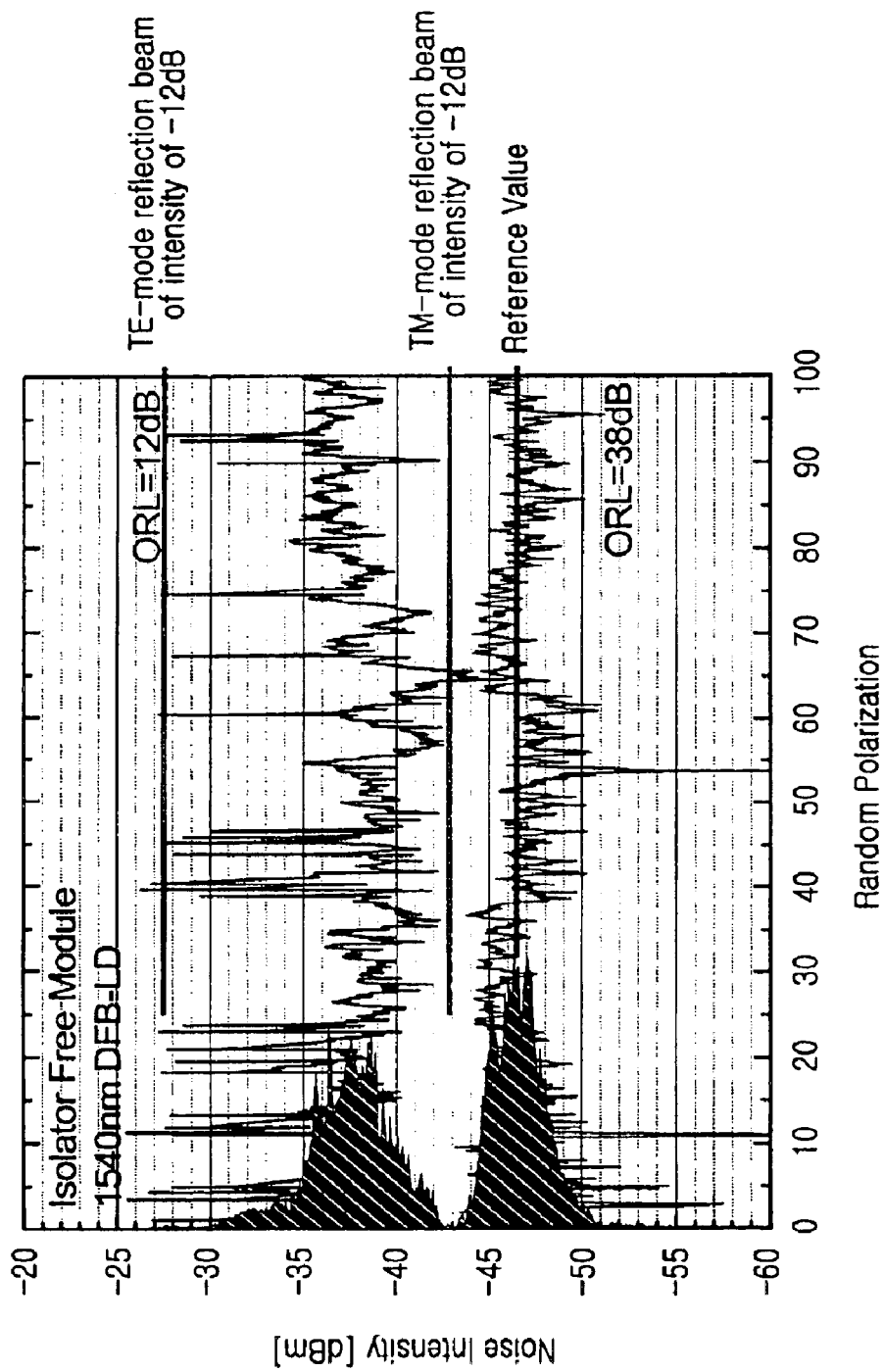
FIG. 3 is a graph showing the change of a noise value measured in a first beam of TE polarization mode outputted from a semiconductor laser when reflection light of a predetermined intensity is inputted to the laser.

FIG. 3 is a graph showing the change of a noise value measured in the first beam 201 of TE polarization mode outputted from the semiconductor laser 210 of FIG. 2, when reflection light of a predetermined intensity is inputted to the laser 210. The polarization mode of the reflection light inputted to the laser 210 is randomly selected with a mode controller.

Generally, such a graph would include reference information obtained from measurements of a noise-free condition where there is no influence of reflection light upon the semiconductor laser 210. However, a noise light intensity of −38 dB, which indicates there is almost no influence of reflection light, was set as a reference noise value for the measurement.

This measurement employed a mirror to partially reflect the first beam outputted by the laser, so that it was used as the reflection light inputted to the laser. The intensity of reflection light employed in this experiment was −12 dB. The change of the noise value was measured in the first beam outputted by the semiconductor laser due to reflection beams of TE and TM polarization modes inputted to the laser 210.

It can be seen from FIG. 3 that the noise value detected in the first beam outputted by the laser is increased by about 3 dB to 4 dB from the reference value when a reflection beam of TM polarization mode, having an intensity of −12 dB, is inputted to the laser. On the contrary, the noise value detected in the first beam outputted by the laser is increased by about 15 dB from the reference value when a reflection beam of TE polarization mode, having the same intensity of −12 dB, is inputted to the laser.

As apparent from the above description, the present invention allows the polarization mode of reflection light inputted to the laser to be opposite to the light outputted by the laser. Consequently, the semiconductor laser itself serves as an analyzer to decrease the noise value.

Advantageously, the optical module of an isolator structure according to the present invention can implement an isolator function without using two polarizers arranged to have polarization axes tilted at 45° to each other. In other words, the semiconductor laser of the present invention serves as a kind of analyzer, thereby simplifying optical-axis alignment and achieving a cost reduction.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical module of an optical isolator comprising:
   a semiconductor laser for outputting a first linearly-polarized beam of a predetermined polarization mode;
   a polarizer positioned to face an end of the semiconductor laser, wherein a polarization axis of the polarizer is at a 45° angle with a polarization direction of the first beam; and
   a Faraday rotator between the semiconductor laser and the polarizer, wherein said rotator rotates the polarization direction of the first beam by 45° to substantially coincide with the polarization axis of the polarizer and rotates a second beam from the polarizer by 45° and provides the rotated second beam to the semiconductor laser, wherein the second beam has a polarization mode polarized perpendicular to the first beam and the polarization mode of the second beam received by the semiconductor laser after passing through the Faraday rotator is a TM mode.

2. The optical module as set forth in claim 1, wherein the Faraday rotator provides the rotated first beam to the polarizer.

3. The optical module as set forth in claim 1, further comprising a lens between the semiconductor laser and the Faraday rotator.

4. The optical module as set forth in claim 1, further comprising an optical element facing an outer surface of the polarizer.

5. The optical module as set forth in claim 4, wherein the optical element facing is a lens.

6. The optical module as set forth in claim 1, wherein the polarization mode of the first beam is a TE mode.

7. The optical module as set forth in claim 1, wherein the second beam received by the semiconductor laser after passing through the Faraday rotator has a polarization mode polarized perpendicular to the first beam.

8. An optical module of an optical isolator comprising:
   a semiconductor laser for outputting a first linearly-polarized beam of TM mode;

a polarizer disposed to face an end of the semiconductor laser, wherein a polarization axis of the polarizer is tilted at 45° angle to a polarization direction of the first beam; and a Faraday rotator between the semiconductor laser and the polarizer, wherein the rotator (1) rotates the polarization direction of the first beam by 45° to substantially coincide with the polarization axis of the polarizer, (2) outputs the rotated first beam to the polarizer, (3) rotates a second beam from the polarizer by 45°, wherein the rotated second beam has a polarization mode polarized perpendicular to the first beam, and (4) outputs the rotated second beam to the semiconductor laser.

9. The optical module as set forth in claim 8, wherein the second beam from the Faraday rotator to the semiconductor laser is a beam of a TE polarization mode linearly polarized perpendicular to the first beam.

* * * * *